(12) United States Patent
Lewis et al.

(10) Patent No.: US 10,807,083 B1
(45) Date of Patent: Oct. 20, 2020

(54) METALLOPHOSPHATE MOLECULAR SIEVES AND METHOD OF PREPARATION AND USE

(71) Applicant: UOP LLC, Des Plaines, IL (US)

(72) Inventors: Gregory J. Lewis, Santa Cruz, CA (US); Lisa M. Knight, Chicago, IL (US)

(73) Assignee: UOP LLC, Des Plaines, IL (US)

( * ) Notice: Subject to any disclaimer, the term of this patent is extended or adjusted under 35 U.S.C. 154(b) by 0 days.

(21) Appl. No.: 16/431,587

(22) Filed: Jun. 4, 2019

(51) Int. Cl.
| | |
|---|---|
| *B01J 29/85* | (2006.01) |
| *C01B 39/54* | (2006.01) |
| *B01J 37/08* | (2006.01) |
| *C01B 39/04* | (2006.01) |

(52) U.S. Cl.
CPC ............ *B01J 29/85* (2013.01); *B01J 37/08* (2013.01); *C01B 39/04* (2013.01); *C01B 39/54* (2013.01); *C01P 2002/30* (2013.01); *C01P 2002/72* (2013.01)

(58) Field of Classification Search
CPC ..... B01J 29/85; B01J 2229/183; C01B 39/54; C01B 39/04; C10G 35/095
USPC .................................................. 423/705, 718
See application file for complete search history.

(56) References Cited

U.S. PATENT DOCUMENTS

| | | |
|---|---|---|
| 4,310,440 A | 1/1982 | Wilson et al. |
| 4,440,871 A | 4/1984 | Lok et al. |
| 4,973,785 A | 11/1990 | Lok et al. |
| 8,871,177 B2 | 10/2014 | Lewis et al. |
| 8,871,178 B2 | 10/2014 | Lewis et al. |
| 10,159,964 B2 | 12/2018 | Lewis et al. |
| 10,159,965 B2 | 12/2018 | Lewis et al. |
| 2017/0252732 A1 | 9/2017 | Lewis et al. |
| 2017/0252733 A1 | 9/2017 | Lewis et al. |
| 2017/0252734 A1 | 9/2017 | Lewis et al. |
| 2017/0341065 A1 | 11/2017 | Lewis et al. |
| 2017/0341948 A1 | 11/2017 | Lewis et al. |
| 2018/0361368 A1 | 12/2018 | Lewis et al. |
| 2019/0009258 A1 | 1/2019 | Lewis et al. |
| 2019/0105641 A1 | 4/2019 | Lewis et al. |
| 2019/0105642 A1 | 4/2019 | Lewis et al. |

OTHER PUBLICATIONS

Nobel, Microporous Magnesium Aluminophosphate STA-1: Synthesis with a Rationally Designed Template and Structure Elucidation by Microcrystal Diffraction, Angew. Chem. Int. Ed., 36, 81-83, 1997.
Pinar, Synthesis of Zn-Containing microporus aluminophosphate with the STA-1 structure, Dalton Trans. 2011, 40, 8125-8131.
Broach, New ABC-6 net molecular sieves ZnAPO-57 and ZnAPO-59: Framework charge density induced transition from two to three dimensional porosity, Microporous and Mesoporous Materials, 189, 2014, 49-63.
Seo, Combined Alkali-Organoammonium Structure Direction of High-Charge-Density Heteroatom-Containng Aluminophosphate Molecular Sieves, Angew. Chem. Int. Ed. 2019, 58, 1-7, and supporting information.
Pinar, Enabling the use of large-pore three-dimensional microporous zinc aluminophosphate STA-1 for catalysis, Microporous and Mesoporous Materials, 2012, 153, 263-266.

*Primary Examiner* — Thuan D Dang

(57) ABSTRACT

A new family of a microporous crystalline metallophosphate-based materials designated AlPO-75 has been synthesized. These metallophosphate-based materials are represented by the empirical formula $$R^{p+}{}_{r}M^{2+}{}_{w}E_{x}PSi_{y}O_{z}$$

where R is a quaternary ammonium cation such as N,N,N',N'-tetramethyl-N,N'-p-xyleno-1,6-hexanediammonium, M is a divalent framework metal such as magnesium or zinc, E is a framework element such as aluminum or gallium and the framework may optionally contain silicon. The microporous AlPO-75 compositions are characterized by having the SAO topology and have catalytic properties for carrying out various hydrocarbon conversion processes and separating properties for separating at least one component.

6 Claims, No Drawings

METALLOPHOSPHATE MOLECULAR SIEVES AND METHOD OF PREPARATION AND USE

FIELD

This disclosure relates to a new family of charged microporous metallophosphate molecular sieves designated AlPO-75. They are represented by the empirical formula of:

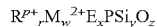

$$R^{p+}{}_rM_w{}^{2+}E_xPSi_yO_z$$

where M is a divalent framework metal such as magnesium or zinc, R is a quaternary ammonium cation such as N,N,N',N'-tetramethyl-N,N'-p-xyleno-1,6-hexanediammonium and E is a trivalent framework element such as aluminum or gallium. The AlPO-75 molecular sieves have the SAO topology.

BACKGROUND

Zeolites are crystalline aluminosilicate microporous compositions which are formed from corner sharing $AlO_{4/2}^-$ and $SiO_{4/2}$ tetrahedra. Numerous zeolites, both naturally occurring and synthetically prepared are used in a variety of industrial and environmental applications. Synthetic zeolites are prepared via hydrothermal synthesis employing suitable sources of Si, Al and structure directing agents such as alkali metals, alkaline earth metals, amines, or organoammonium cations. The structure directing agents reside in the pores of the zeolite and are largely responsible for the particular structure that is ultimately formed. These species balance the framework charge associated with aluminum and can also serve as space fillers. Zeolites are characterized by having pore openings of uniform dimensions, having a significant ion exchange capacity, and being capable of reversibly desorbing an adsorbed phase which is dispersed throughout the internal voids of the crystal without significantly displacing any atoms which make up the permanent zeolite crystal structure. Zeolites can be used as catalysts for hydrocarbon conversion reactions, which can take place on the outside surfaces of the zeolite as well as on internal surfaces within the pores of the zeolite.

Over the years, new chemistry has been designed to adapt the hydrothermal synthesis techniques to produce microporous materials of other compositions, e.g., non-zeolitic compositions. In 1982, Wilson et al. first reported aluminophosphate molecular sieves, the so-called AlPOs, which are microporous materials that have many of these same properties of zeolites, although they are silica free, composed of $AlO_{4/2}^-$ and $PO_{4/2}^+$ tetrahedra (See U.S. Pat. No. 4,310,440). The AlPOs are formally neutral, they do not possess framework charge. Subsequently, charge was introduced to the neutral aluminophosphate frameworks via the substitution of $SiO_{4/2}$ tetrahedra for $PO_{4/2}^+$ tetrahedra to produce the SAPO molecular sieves (See U.S. Pat. No. 4,440,871). Another way to introduce framework charge to neutral aluminophosphates is to substitute $[M^{2+}O_{4/2}]^{2-}$ tetrahedra for $AlO_{4/2}^-$ tetrahedra, which yield the MeAPO molecular sieves (see U.S. Pat. No. 4,567,029). It is furthermore possible to introduce framework charge on AlPO-based molecular sieves via the simultaneous introduction of $SiO_{4/2}$ and $[M^{2+}O_{4/2}]^{2-}$ tetrahedra to the framework, giving MeAPSO molecular sieves (See U.S. Pat. No. 4,973,785). These groundbreaking patents opened new territory upon which technologists have built ever since, introducing new chemistry that has increased the diversity of compositions and structures known among the members. One advance was the synthesis of STA-1, the magnesioaluminophosphate $R_{2.6}Mg_5Al_{23}P_{28}O_{112}$, where R is a diquat consisting of two quinuclidine molecules, $C_7H_{13}N$, joined together by a paraffinic C7 group, $C_7H_{14}$, that attaches on each end to the N of each quinuclidine (See Angew. Chem. Int. Ed., 36, 81-83, 1997). This material consists of a three-dimensional microporous structure that has been designated the SAO topology by the International Zeolite Association Structure Commission (See Database of Zeolite Structures, SAO Topology). The pores feature 12-ring openings. A zincoaluminophosphate composition with the same topology, $R_xZn_{4.5}Al_{23.5}P_{28}O_{112}$, where R is benzylpyrrolidine or N-benzylpyrrolidine-2-methanol, was synthesized incorporating a little less Zn than the Mg incorporated into STA-1 (See Dalton Trans. 2011, 40, 8125-8131; Microporous and Mesoporous Materials, 2012, 153, 263-266). The maximum incorporation of M' into the framework of these materials is $5 Mg^{2+}/(5 Mg^{2+}+23 Al^{3+})=17.8\%$ replacement of Al atoms and $5 Mg^{2+}/(5 Mg^{2+}+23 Al^{3+}+28 P^{5+})=8.9\%$ replacement of the framework T-atoms, which includes Al and P.

Applicants have recently pointed out that after 35+ years of research in this area, there is a lack of high framework charge density MeAPO, SAPO and MeAPSO compositions and have pursued the synthesis of these higher charge density materials, that contain higher levels of $Me^{2+}$ and Si incorporation that increase the framework charge (See Microporous and Mesoporous Materials, 189, 2014, 49-63). A microporous framework with higher charge density will have higher ion exchange capacity and higher acid site density in the $H^+$ form. Some initial work in the diethyldimethylammonium (DEDMA) and ethyltrimethylammonium (ETMA) SDA systems led to the new MeAPO, MeAPSO, and SAPO species AlPO-57 (U.S. Pat. No. 8,871,178, AFV topology) and AlPO-59 (U.S. Pat. No. 8,871,177, AVL topology), in which up to 30% of Al or P were replaced by $Me^{2+}$ or Si, respectively (See Microporous and Mesoporous Materials, 189, 2014, 49-63). Further work by applicants have recently demonstrated that it is possible to replace 50% or more of Al or P with $Me^{2+}$ or Si under high charge density synthesis conditions (sufficiently high $OH^-/H_3PO_4$) in the presence of a combination alkali and quaternary ammonium structure directing agents (SDAs) in aqueous media. Examples include PST-19 (See U.S. Pat. No. 10,159,964) and PST-16 (U.S. Pat. No. 10,159,965) and pending applications 20170252732A1, 20170252733A1, 20170252734A1, 20170341065A1, 20170341948A1, 20180361368A1, 20190009258A1, 20190105641A1 and 20190105643A1. The chemistry developed to obtain these new high framework charge density MeAPO, and SAPO materials was recently documented in a publication (See Angew. Chem. Int. Ed. 10.1002/anie.201902623).

Applicants have now synthesized a new family of high framework charge density microporous MeAPO and MeAPSO compositions with the SAO topology. The MeAPO compositions contain significantly more $Me^{2+}$ than the SAO MeAPO compositions in the prior art and for the first time, Si is introduced into the SAO framework in the MeAPSO materials. In the MeAPO compositions, at least 23% of the Al is replaced by $Me^{2+}$ and in the MeAPSO compositions, at least 11.5% of all T-atoms are accounted for by inserted $Me^{2+}$ and Si, both significantly higher heteroatom insertion than previously observed for the SAO compositions of the prior art.

SUMMARY

As stated, the present disclosure relates to a new family of microporous metallophosphate molecular sieves designated AlPO-75. Accordingly, one embodiment of the disclosure is a microporous crystalline material having a three-dimensional framework of at least $EO_2^-$, $PO_2^+$ and $[M^{2+}O_2]^{2-}$ tetrahedral units and optionally $SiO_2$ tetrahedral units and an empirical composition in the as synthesized and anhydrous basis expressed by an empirical formula of:

$$R^{p+}_r M^{2+}_w E_x PSi_y O_z$$

where M is at least one framework divalent metal cation selected from $Mg^{2+}$, $Zn^{2+}$, $Co^{2+}$ and $Mn^{2+}$ combinations thereof, "w" is the mole ratio of M to P and varies from 0.1 to about 0.35, R is a quaternary ammonium cation selected from tetraethylammonium (TEA$^+$), methyltriethylammonium (MTEA$^+$), dimethyldipropylammonium (DMDPA$^+$), tetrapropylammonium (TPA$^+$), tetrabutylammonium (TBA$^+$), N,N,N',N'-tetramethyl-N,N'-p-xyleno-1,6-hexanediammonium (pXC$_6^{2+}$), N,N,N',N'-tetramethyl-N,N'-m-xyleno-1,6-hexanediammonium (mXC$_6^{2+}$), the quaternary ammonium cation resulting from the alkylation of N,N,N',N'-tetramethyl-1,6-hexanediamine with 1,3,5-tris(bromomethyl)benzene (TC$_6^{3+}$), the quaternary ammonium cation resulting from the alkylation of N,N,N',N'-tetramethyl-1,6-hexanediamine with 2,4,6-tris(bromomethyl)phenol (TOHC$_6^{3+}$) and combinations thereof, "r" is the mole ratio of R to P and has a value of about 0.1 to about 0.75, "p" is the average weighted valence of R and varies from 1 to 3, E is an trivalent element selected from aluminum, gallium and combinations thereof, "x" is mole ratio of E to P and varies from 0.65 to 1.2, "y" is the mole ratio of Si to P and varies from 0 to 1.0, the amount of combined $M^{2+}$ and Si insertion into the framework is given by $(w+y)/(w+x+1+y) \geq 0.115$, and "z" is the mole ratio of O to P and has a value determined by the equation:

$$z=(p \cdot r+2 \cdot w+3 \cdot x+5+4 \cdot y)/2$$

and is characterized in that it has the x-ray diffraction pattern having at least the d-spacings and intensities set forth in Table A:

TABLE A

| 2Θ | d(Å) | I/I₀ % |
|---|---|---|
| 7.685-7.465 | 11.494-11.833 | vs |
| 8.215-7.963 | 10.755-11.095 | w-m |
| 9.221-8.838 | 9.583-9.998 | w |
| 12.285-12.022 | 7.199-7.356 | w |
| 12.893-12.683 | 6.861-6.974 | w |
| 13.889-13.588 | 6.371-6.511 | w-m |
| 15.001-14.739 | 5.901-6.005 | w-m |
| 15.277-15.017 | 5.795-5.895 | w-m |
| 16.376-16.039 | 5.409-5.522 | w |
| 18.763-18.438 | 4.726-4.808 | w-m |
| 19.791-19.511 | 4.482-4.546 | m-vs |
| 20.858-20.542 | 4.255-4.320 | m-s |
| 21.463-21.138 | 4.137-4.200 | w-m |
| 22.895-22.661 | 3.881-3.921 | w |
| 23.639-23.365 | 3.761-3.804 | w |
| 24.580-24.239 | 3.619-3.669 | w |
| 25.077-24.739 | 3.548-3.596 | w-m |
| 25.859-25.569 | 3.443-3.481 | m |
| 26.221-25.923 | 3.396-3.434 | w-m |
| 26.962-26.717 | 3.304-3.334 | w |
| 27.819-27.455 | 3.204-3.246 | w |
| 29.439-29.117 | 3.032-3.064 | w-m |
| 30.090-29.814 | 2.968-2.994 | w |
| 30.689-30.407 | 2.911-2.937 | w-m |
| 31.117-30.804 | 2.872-2.900 | w |
| 33.767-33.465 | 2.652-2.676 | w-m |
| 34.147-33.846 | 2.624-2.646 | w |
| 34.792-34.453 | 2.576-2.601 | w-m |

Another embodiment of the disclosure is a process for preparing the crystalline microporous metallophosphate molecular sieve described above. The process comprises forming a reaction mixture containing reactive sources of R, M, E, P and optionally Si and heating the reaction mixture at a temperature of about 60° C. to about 200° C. for a time sufficient to form the molecular sieve, the reaction mixture having a composition expressed in terms of mole ratios of the oxides of:

$$aR_{2/p}O:bMO:E_2O_3:cP_2O_5:dSiO_2:eH_2O$$

where "a" has a value of about 0.75 to about 22, "b" has a value of about 0.05 to about 2, "c" has a value of about 1.0 to about 10, "d" has a value of about 0 to about 4, and "e" has a value from 20 to 2000.

Yet another embodiment of the disclosure is a hydrocarbon conversion process using the above-described molecular sieve as a catalyst. The process comprises contacting at least one hydrocarbon with the molecular sieve at conversion conditions to generate at least one converted hydrocarbon.

Still another embodiment of the disclosure is a separation process using the crystalline AlPO-75 material. The process may involve separating mixtures of molecular species or removing contaminants by contacting a fluid with the AlPO-75 molecular sieve. Separation of molecular species can be based either on the molecular size (kinetic diameter) or on the degree of polarity of the molecular species. Removing contaminants may be by ion exchange with the molecular sieve.

DETAILED DESCRIPTION

Applicants have synthesized a new family of high framework charge density microporous MeAPO and MeAPSO compositions with the SAO topology. The MeAPO compositions contain significantly more Me$^{2+}$ than the SAO MeAPO compositions in the prior art and for the first time, Si is introduced into the SAO framework in the MeAPSO materials. In the MeAPO compositions, at least 23% of the Al is replaced by Me$^{2+}$ and in the MeAPSO compositions, at least 11.5% of all T-atoms are accounted for by inserted Me$^{2+}$ and Si, both significantly higher heteroatom insertion than previously observed for the SAO compositions of the prior art.

The instant microporous crystalline material (AlPO-75) has an empirical composition in the as-synthesized form and on an anhydrous basis expressed by the empirical formula:

$$R^{p+}_r M^{2+}_w E_x PSi_y O_z$$

where M is at least one divalent framework metal cation and is selected from alkaline earth and transition metals. Specific examples of the M cations include but are not limited to magnesium, cobalt (II), manganese, zinc and combinations thereof. R is a quaternary ammonium cation examples of which include but are not limited to tetraethylammonium (TEA$^+$), methyltriethylammonium (MTEA$^+$), dimethyldipropylammonium (DMDPA$^+$), tetrapropylammonium (TPA$^+$), tetrabutylammonium (TBA$^+$), N,N,N',N'-tetramethyl-N,N'-p-xyleno-1,6-hexanediammonium (pXC$_6^{2+}$), N,N,N',N'-tetramethyl-N,N'-m-xyleno-1,6-hexanediammonium (mXC$_6^{2+}$), the quaternary ammonium cation resulting from the alkylation of N,N,N',N'-tetramethyl-1,6-hexanediamine with 1,3,5-tris(bromomethyl)benzene (TC$_6^{3+}$), the quaternary ammonium cation resulting from the alkylation of N,N,N',N'-tetramethyl-1,6-hexanediamine with 2,4,6-tris(bromomethyl)phenol (TOHC$_6^{3+}$) and combinations thereof, and "r" is the mole ratio of R to P and varies from about 0.1 to 0.75, "p" is the average weighted valence of R and varies from 1 to 3. The value of "w" is the mole ratio of M to P and varies from 0.1 to 0.35. E is a trivalent element which is tetrahedrally coordinated, is present in the framework and is selected from aluminum, gallium and combinations thereof, "x" is mole ratio of E to P and varies from 0.65 to 1.2. The ratio of silicon to P is represented by "y" which varies from about 0 to 1.0 and (w+y)/(w+x+1+y)≥0.115. Lastly, "z" is the mole ratio of O to P and is given by the equation:

$$z=(p \cdot r+2 \cdot w+3 \cdot x+5+4 \cdot y)/2$$

When only one type of R quaternary ammonium cation is present, then the weighted average valence is just the valence of that cation, e.g., +1 or +2. When more than one R cation is present, the total amount of R is given by the equation:

$$R_r^{p+}=R_{r1}^{(p1)+}+R_{r2}^{(p2)+}+R_{r3}^{(p3)+}+$$

the weighted average valence "p" is given by:

$$p = \frac{r1 \cdot p1 + r2 \cdot p2 + r3 \cdot p3 + \dots}{r1 + r2 + r3 + \dots}$$

The microporous crystalline metallophosphate material, AlPO-75, is prepared by a hydrothermal crystallization of a reaction mixture prepared by combining reactive sources of R, E, phosphorous, M and optionally silicon. When E is aluminum, the sources of include but are not limited to aluminum alkoxides, precipitated aluminas, aluminum metal, aluminum hydroxide, aluminum salts and alumina sols. Specific examples of aluminum alkoxides include, but are not limited to aluminum ortho sec-butoxide and aluminum ortho isopropoxide. When E is gallium sources include precipitated gallium oxyhydroxide, gallium nitrate, gallium chloride and gallium sulfate. Of course, E may be any combination of Al and Ga. Sources of phosphorus include, but are not limited to, orthophosphoric acid, phosphorus pentoxide, and ammonium dihydrogen phosphate. Sources of silica include but are not limited to tetraethylorthosilicate, colloidal silica, and precipitated silica. Sources of the M metals include the halide salts, nitrate salts, acetate salts, and sulfate salts of the respective alkaline earth and transition metals. R is a quaternary ammonium cation consisting of tetraethylammonium (TEA$^+$), methyltriethylammonium (MTEA$^+$), dimethyldipropylammonium (DMDPA$^+$), tetrapropylammonium (TPA$^+$), tetrabutylammonium (TBA$^+$), N,N,N',N'-tetramethyl-N,N'-p-xyleno-1,6-hexanediammonium (pXC$_6^{2+}$), N,N,N',N'-tetramethyl-N,N'-m-xyleno-1,6-hexanediammonium (mXC$_6^{2+}$), the quaternary ammonium cation resulting from the alkylation of N,N,N',N'-tetramethyl-1,6-hexanediamine with 1,3,5-tris(bromomethyl)benzene (TC$_6^{3+}$), the quaternary ammonium cation resulting from the alkylation of N,N,N',N'-tetramethyl-1,6-hexanediamine with 2,4,6-tris(bromomethyl)phenol (TOHC$_6^{3+}$) and combinations thereof, and the sources include the hydroxide, chloride, bromide, iodide and fluoride compounds. Specific examples include without limitation N,N,N',N'-tetramethyl-N,N'-p-xyleno-1,6-hexanediammonium dibromide, N,N,N',N'-tetramethyl-N,N'-p-xyleno-1,6-hexanediammonium dihydroxide, N,N,N',N'-tetramethyl-N,N'-m-xyleno-1,6-hexanediammonium dibromide, tetrapropylammonium hydroxide, dimethyldipropylammonium hydroxide, methyltriethylammonium hydroxide, and tetrabutylammonium hydroxide. In a specific embodiment, R is N,N,N',N'-tetramethyl-N,N'-p-xyleno-1,6-hexanediammonium. In another embodiment, R is a combination of N,N,N',N'-tetramethyl-N,N'-p-xyleno-1,6-hexanediammonium and tetrapropylammonium. In another embodiment, R is a combination of N,N,N',N'-tetramethyl-N,N'-m-xyleno-1,6-hexanediammonium and tetrapropylammonium. In yet another embodiment, R is a combination of TC$_6^{3+}$ and tetrapropylammonium. In another embodiment R is a combination of N,N,N',N'-tetramethyl-N,N'-p-xyleno-1,6-hexanediammonium and at least one quaternary ammonium cation selected from TPA$^+$, TEA$^+$, TBA$^+$, DMDPA$^+$ and MTEA$^+$ and combinations thereof.

The reaction mixture containing reactive sources of the desired components can be described in terms of molar ratios of the oxides by the formula:

$$aR_{2/p}O:bMO:E_2O_3:cP_2O_5:dSiO_2:eH_2O$$

where "a" has a value of about 0.75 to about 22, "b" has a value of about 0.05 to about 2, "c" has a value of about 1.0 to about 10, "d" has a value of about 0 to about 4, and "e" has a value from 20 to 2000. If alkoxides are used, it is preferred to include a distillation or evaporative step to remove the alcohol hydrolysis products. The reaction mixture is now reacted at a temperature of about 60° C. to about 200° C. and preferably from about 125° C. to about 175° C. for a period of about 1 day to about 3 weeks and preferably for a time of about 2 days to about 10 days in a sealed reaction vessel under autogenous pressure. After crystallization is complete, the solid product is isolated from the heterogeneous mixture by means such as filtration or centrifugation, and then washed with deionized water and dried in air at ambient temperature up to about 100° C. AlPO-75 seeds can optionally be added to the reaction mixture to accelerate the formation of the desired microporous composition.

The AlPO-75 metallophosphate-based material, which is obtained from the above-described process, is characterized by the x-ray diffraction pattern, having at least the d-spacings and relative intensities set forth in Table A below.

TABLE A

| 2Θ | d(Å) | I/I$_0$ % |
|---|---|---|
| 7.685-7.465 | 11.494-11.833 | vs |
| 8.215-7.963 | 10.755-11.095 | w-m |
| 9.221-8.838 | 9.583-9.998 | w |
| 12.285-12.022 | 7.199-7.356 | w |
| 12.893-12.683 | 6.861-6.974 | w |
| 13.889-13.588 | 6.371-6.511 | w-m |
| 15.001-14.739 | 5.901-6.005 | w-m |
| 15.277-15.017 | 5.795-5.895 | w-m |
| 16.376-16.039 | 5.409-5.522 | w |
| 18.763-18.438 | 4.726-4.808 | w-m |
| 19.791-19.511 | 4.482-4.546 | m-vs |
| 20.858-20.542 | 4.255-4.320 | m-s |
| 21.463-21.138 | 4.137-4.200 | w-m |
| 22.895-22.661 | 3.881-3.921 | w |
| 23.639-23.365 | 3.761-3.804 | w |
| 24.580-24.239 | 3.619-3.669 | w |
| 25.077-24.739 | 3.548-3.596 | w-m |
| 25.859-25.569 | 3.443-3.481 | m |
| 26.221-25.923 | 3.396-3.434 | w-m |
| 26.962-26.717 | 3.304-3.334 | w |
| 27.819-27.455 | 3.204-3.246 | w |
| 29.439-29.117 | 3.032-3.064 | w-m |

TABLE A-continued

| 2Θ | d(Å) | I/I₀ % |
|---|---|---|
| 30.090-29.814 | 2.968-2.994 | w |
| 30.689-30.407 | 2.911-2.937 | w-m |
| 31.117-30.804 | 2.872-2.900 | w |
| 33.767-33.465 | 2.652-2.676 | w-m |
| 34.147-33.846 | 2.624-2.646 | w |
| 34.792-34.453 | 2.576-2.601 | w-m |

A favored approach for the synthesis of AlPO-75 metallophosphates is the Charge Density Mismatch Approach, which has been applied to the synthesis of aluminosilicate zeolites (See U.S. Pat. No. 7,578,993 and Chem. Mater., 2014, 26, 6684-6694). It is applied to the synthesis of higher charge density SAO metallophosphates here. Metalloalumino(silico)phosphate solutions are prepared with excess phosphate and hydroxide sources containing and large, low charge density SDAs, such as TPAOH and TBAOH, which are then perturbed by the addition of more highly charged quaternary ammonium cations, examples of which include $pXC_6^{2+}$ and $TC_6^{3+}$, which induce crystallization under the synthesis conditions. This leads to rich chemistry in which there is often cooperation between multiple SDAs to form one molecular sieve structure. The method has advantages in expense and efficiency because non-commercially available quaternary ammonium cations, like $pXC_6^{2+}$ and $TC_6^{3+}$, can be utilized in relatively small amounts as halide salts; they don't have to be converted to the hydroxide form for use, an additional and expensive step.

The AlPO-75 may be modified in many ways to tailor it for use in a particular application. Modifications include calcination, ammonia calcinations, ion-exchange, steaming, various acid extractions, ammonium hexafluorosilicate treatment, or any combination thereof, as outlined for the case of UZM-4 in U.S. Pat. No. 6,776,975 B1, which is incorporated by reference in its entirety. Properties that are modified include porosity, adsorption, framework composition, acidity, thermal stability, etc.

As synthesized, the AlPO-75 material contains some of the exchangeable or charge balancing cations in its pores. These exchangeable cations can be exchanged for other cations, the large 12-ring pores of the SAO can facilitate the direct ion exchange of organic cations in some cases. In the case of organic cations that cannot be removed directly by ion exchange, the organic cations can be removed by heating under controlled conditions, for instance, in dry air, nitrogen, or ozone-containing atmospheres, with very specific temperature profiles. One method of removing organic cations from the pores is ammonia calcination. Calcination in air converts organic cations in the pores to protons, which can, for example, lead to some removal of Al from the framework upon exposure to water vapor. When the calcination is carried out in an ammonia atmosphere, the organic cation in the pore is replaced by $NH_4^+$ cation and the framework remains intact (See Studies in Surface Science, (2004) vol. 154, p. 1324-1331). Typical conditions for ammonia calcinations include the use of gaseous anhydrous ammonia flowing at a rate of 1.1 l/min while ramping the sample at 5° C./min to 500° C. and holding at that temperature for a time ranging from 5 minutes to an hour. The resulting ammonium form of AlPO-75 has essentially the diffraction pattern of Table A. Once in this form, the ammonia calcined material may be ion-exchanged with $H^+$, $NH_4^+$, alkali metals, alkaline earth metals, transition metals, rare earth metals, or any combination thereof, to achieve a wide variety of compositions with the AlPO-75 framework in superior condition.

When AlPO-75 or its modified forms are calcined in air, there can be a loss of metal from the framework, such as Al, which can alter the x-ray diffraction pattern from that observed for the as-synthesized AlPO-75 (See Studies in Surface Science, (2004) vol. 154, p. 1324-1331). Typical conditions for the calcination of the AlPO-75 sample include ramping the temperature from room temperature to a calcination temperature of 400-600° C., preferably a calcination temperature of 450-550° C. at a ramp rate of 1 to 5° C./min, preferably a ramp rate of 2 to 4° C./min, the temperature ramp conducted in an atmosphere consisting either of flowing nitrogen or flowing clean dry air, preferably an atmosphere of flowing nitrogen. Once at the desired calcination temperature, if the calcination atmosphere employed during the temperature ramp is flowing clean dry air, it may remain flowing clean dry air. If the calcination atmosphere during the ramp was flowing nitrogen, it may remain flowing nitrogen at the calcination temperature or it may be immediately converted to clean dry air; preferably at the calcination temperature the calcination atmosphere will remain flowing nitrogen for a period of 1-10 hr and preferably for a period of 2-4 hours before converting the calcination atmosphere to flowing clean dry air. The final step of the calcination is a dwell at the calcination temperature in clean dry air. Whether the calcination atmosphere during the initial temperature ramp was flowing nitrogen or flowing clean dry air, once at the calcination temperature and once the calcination atmosphere is clean dry air, the AlPO-75 sample will spend a period of 1-24 hr or a period of 2-6 hr under these conditions to complete the calcination process.

In one embodiment of the disclosure, the AlPO-75 is thermally stable up to a temperature of at least 400° C., in another embodiment the AlPO-75 is thermally stable up to a temperature of at least 500° C. and in yet another embodiment AlPO-75 is thermally stable up to a temperature of 600° C.

The crystalline AlPO-75 materials of this disclosure can be used for separating mixtures of molecular species, removing contaminants through ion exchange and catalyzing various hydrocarbon conversion processes. Separation of molecular species can be based either on the molecular size (kinetic diameter) or on the degree of polarity of the molecular species.

The AlPO-75 compositions of this disclosure can also be used as a catalyst or catalyst support in various hydrocarbon conversion processes. Hydrocarbon conversion processes are well known in the art and include cracking, hydrocracking, alkylation of both aromatics and isoparaffin, isomerization, polymerization, reforming, hydrogenation, dehydrogenation, transalkylation, dealkylation, hydration, dehydration, hydrotreating, hydrodenitrogenation, hydrodesulfurization, methanol to olefins, methanation and syngas shift process. Specific reaction conditions and the types of feeds which can be used in these processes are set forth in U.S. Pat. Nos. 4,310,440, 4,440,871 and 5,126,308, which are incorporated by reference. Specific hydrocarbon conversion processes are those in which hydrogen is a component such as hydrotreating or hydrofining, hydrogenation, hydrocracking, hydrodenitrogenation, hydrodesulfurization, etc.

Hydrocracking conditions typically include a temperature in the range of 400° to 1200° F. (204-649° C.), preferably between 600° and 950° F. (316-510° C.). Reaction pressures are in the range of atmospheric to about 3,500 psig (24,132 kPa g), preferably between 200 and 3000 psig (1379-20,685 kPa g). Contact times usually correspond to liquid hourly space velocities (LHSV) in the range of about 0.1 hr$^{-1}$ to 15 hr$^{-1}$, preferably between about 0.2 and 3 hr$^{-1}$. Hydrogen circulation rates are in the range of 1,000 to 50,000 standard cubic feet (scf) per barrel of charge (178-8,888 std. m$^3$/m$^3$), preferably between 2,000 and 30,000 scf per barrel of charge (355-5,333 std. m$^3$/m$^3$). Suitable hydrotreating conditions are generally within the broad ranges of hydrocracking conditions set out above.

The reaction zone effluent is normally removed from the catalyst bed, subjected to partial condensation and vapor-liquid separation and then fractionated to recover the various components thereof. The hydrogen, and if desired some or all of the unconverted heavier materials, are recycled to the reactor. Alternatively, a two-stage flow may be employed with the unconverted material being passed into a second reactor. Catalysts of the subject disclosure may be used in just one stage of such a process or may be used in both reactor stages.

Catalytic cracking processes are preferably carried out with the AlPO-75 composition using feedstocks such as gas oils, heavy naphthas, deasphalted crude oil residua, etc. with gasoline being the principal desired product. Temperature conditions of 850° to 1100° F., LHSV values of 0.5 to 10 and pressure conditions of from about 0 to 50 psig are suitable.

Alkylation of aromatics usually involves reacting an aromatic ($C_2$ to $C_{12}$), especially benzene, with a monoolefin to produce a linear alkyl substituted aromatic. The process is carried out at an aromatic:olefin (e.g., benzene:olefin) ratio of between 5:1 and 30:1, a LHSV of about 0.3 to about 6 hr$^{-1}$, a temperature of about 100° to about 250° C. and pressures of about 200 to about 1000 psig. Further details on apparatus may be found in U.S. Pat. No. 4,870,222 which is incorporated by reference.

Alkylation of isoparaffins with olefins to produce alkylates suitable as motor fuel components is carried out at temperatures of −30° to 40° C., pressures from about atmospheric to about 6,894 kPa (1,000 psig) and a weight hourly space velocity (WHSV) of 0.1 to about 120. Details on paraffin alkylation may be found in U.S. Pat. Nos. 5,157,196 and 5,157,197, which are incorporated by reference.

The conversion of methanol to olefins is effected by contacting the methanol with the AlPO-75 catalyst at conversion conditions, thereby forming the desired olefins. The methanol can be in the liquid or vapor phase. Contacting the methanol with the AlPO-75 catalyst can be done in a continuous mode or a batch mode. The amount of time that the methanol is in contact with the AlPO-75 catalyst must be sufficient to convert the methanol to the desired light olefin products. When the process is carried out in a batch process, the contact time varies from about 0.001 hrs to about 1 hr and preferably from about 0.01 hr to about 1.0 hr. The longer contact times are used at lower temperatures while shorter times are used at higher temperatures. Further, when the process is carried out in a continuous mode, the Weight Hourly Space Velocity (WHSV) based on methanol can vary from about 1 hr$^{-1}$ to about 1000 hr$^{-1}$ and preferably from about 1 hr$^{-1}$ to about 100 hr$^{-1}$.

Generally, the process must be carried out at elevated temperatures in order to form light olefins at a fast enough rate. Thus, the process should be carried out at a temperature of about 300° C. to about 600° C., preferably from about 400° C. to about 550° C. and most preferably from about 450° C. to about 525° C. The process may be carried out over a wide range of pressure including autogenous pressure. Thus, the pressure can vary from about 0 kPa (0 psig) to about 1724 kPa (250 psig) and preferably from about 34 kPa (5 psig) to about 345 kPa (50 psig).

Optionally, the methanol feedstock may be diluted with an inert diluent in order to more efficiently convert the methanol to olefins. Examples of the diluents which may be used are helium, argon, nitrogen, carbon monoxide, carbon dioxide, hydrogen, steam, paraffinic hydrocarbons, e. g., methane, aromatic hydrocarbons, e. g., benzene, toluene and combinations thereof. The amount of diluent used can vary considerably and is usually from about 5 to about 90 mole percent of the feedstock and preferably from about 25 to about 75 mole percent.

The actual configuration of the reaction zone may be any well-known catalyst reaction apparatus known in the art. Thus, a single reaction zone or a number of zones arranged in series or parallel may be used. In such reaction zones the methanol feedstock is flowed through a bed containing the AlPO-75 catalyst. When multiple reaction zones are used, one or more AlPO-75 catalysts may be used in series to produce the desired product mixture. Instead of a fixed bed, a dynamic bed system, e. g., fluidized or moving, may be used. Such a dynamic system would facilitate any regeneration of the AlPO-75 catalyst that may be required. If regeneration is required, the AlPO-75 catalyst can be continuously introduced as a moving bed to a regeneration zone where it can be regenerated by means such as oxidation in an oxygen containing atmosphere to remove carbonaceous materials.

The following examples are presented in illustration of this disclosure and are not intended as undue limitations on the generally broad scope of the disclosure as set out in the appended claims. The products will be designated with names that contain the suffix "−75" to indicate the "−75" structure and prefix that reflects the compositional nature of the product, such as "ZnAPO" for a zincoaluminophosphate, MgAPO for a magnesioaluminophosphate, and ZnAPSO for a zincosilicoaluminophosphate, etc.

The structure of the AlPO-75 compositions of this disclosure was determined by x-ray analysis. The x-ray patterns presented in the following examples were obtained using standard x-ray powder diffraction techniques. The radiation source was a high-intensity, x-ray tube operated at 45 kV and 35 mA. The diffraction pattern from the copper K-alpha radiation was obtained by appropriate computer-based techniques. Flat compressed powder samples were continuously scanned at 2° to 56° (2θ). Interplanar spacings (d) in Angstrom units were obtained from the position of the diffraction peaks expressed as θ where θ is the Bragg angle as observed from digitized data. Intensities were determined from the integrated area of diffraction peaks after subtracting background, "$I_o$" being the intensity of the strongest line or peak, and "I" being the intensity of each of the other peaks.

As will be understood by those skilled in the art the determination of the parameter 2θ is subject to both human and mechanical error, which in combination can impose an uncertainty of about ±0.4° on each reported value of 2θ. This uncertainty is, of course, also manifested in the reported values of the d-spacings, which are calculated from the 2θ values. This imprecision is general throughout the art and is not sufficient to preclude the differentiation of the present crystalline materials from each other and from the compositions of the prior art. In some of the x-ray patterns reported, the relative intensities of the d-spacings are indicated by the notations vs, s, m, and w which represent very strong, strong, medium, and weak, respectively. In terms of 100× $I/I_o$, the above designations are defined as: w=greater than 0 to 15; m=greater than 15 to 60: s=greater than 60 to 80 and vs=greater than 80 to 100.

In certain instances, the purity of a synthesized product may be assessed with reference to its x-ray powder diffraction pattern. Thus, for example, if a sample is stated to be pure, it is intended only that the x-ray pattern of the sample is free of lines attributable to crystalline impurities, not that there are no amorphous materials present.

In order to more fully illustrate the disclosure, the following examples are set forth. It is to be understood that the examples are only by way of illustration and are not intended as an undue limitation on the broad scope of the disclosure as set forth in the appended claims.

Example 1 Synthesis of SDA 1

N,N,N',N'-tetramethyl-N,N'-p-xyleno-1,6-hexanediammonium Dibromide

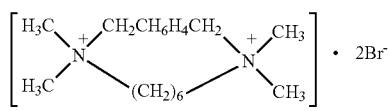

A 50.00 g portion of α,α'dibromo-p-xylene (Sigma-Aldrich) was placed in a 1-liter beaker and dissolved in 550 ml dry tetrahydrofuran (THF) using a stirbar. The resulting solution was transferred to a 1 liter 3-neck round bottom flask equipped with an overhead stirrer, a heating mantle and a reflux condenser. Separately, 33.31 g N,N,N',N'-tetramethyl-1,6-hexanediamine (99%, Sigma-Aldrich) was diluted with 32.50 g THF and placed in a pressure-equalizing dropping funnel that was attached to one of the necks of the round bottom flask. The amine solution was then added dropwise to the dibromide solution in the flask with stirring. Some solid formation was observed during the addition. Upon completion of the addition, the dropping funnel was removed and a thermocouple connected to a temperature controller was inserted into the flask. After stirring for 15 minutes, the reaction mixture was heated to 64° C. and held at that temperature for 42 hr. The reaction was allowed to cool and the solid product was isolated by filtration under a nitrogen blanket. The solid was washed with ether and filtered under nitrogen blanket before residual solvent was removed using a vacuum oven. The identity of cyclic diquat SDA 1, N,N,N',N'-tetramethyl-N,N'-p-xyleno-1,6-hexanediammonium dibromide, in which two dimethyl-substituted quaternized N-atoms are attached by 1) a $(CH_2)_6$ chain and 2) a p-xylyl group, was confirmed by $^{13}C$ nmr as there was excellent agreement between observed and calculated nmr line positions. SDA 1 is designated $pXC_6^{2+}$.

Example 2 Synthesis of SDA 2

SDA 2 was synthesized by dissolving 19.98 g 1,3,5-tris(bromomethyl)benzene in 800 ml THF. The solution was transferred to a 2-L 3-neck round bottom flask equipped with overhead stirrer, condenser and thermocouple. A second solution was prepared by diluting 14.46 g N,N,N',N'-tetramethyl-1,6-hexanediamine in 70 ml THF. This solution was placed in a pressure equalizing dropping funnel and added dropwise to the reaction mixture with vigorous stirring. There was an immediate indication of reaction as a white suspension developed, some cloudiness developed in the solution. An additional 100 ml THF was added to wash out the funnel. The reaction mixture was stirred for an hour before the temperature was ramped to 45° C. After 4 hr at 45° C., the reaction mixture was ramped to 60° C. and held there for 48 hr. The heat was then removed and the reaction mixture allowed to cool. The reaction mixture was filtered under an $N_2$ purge and washed with ether. The product was dried in vacuum and used in this form. SDA 2 is designated $TC_6^{3+}$.

Example 3

A zincoaluminophosphate stock solution was first prepared. A Teflon beaker was charged with 508.43 g TPAOH (40%, aqueous) and placed under a high speed mechanical stirrer. Then 68.76 g aluminum sec-butoxide (10.9% Al) was added to this solution with stirring, resulting in a clear solution. Then $H_3PO_4$ (85.7%), 76.23 g, was added over a period of 3 minutes. The beaker containing the phosphoric acid was washed with 34.22 g deionized water, which was added to the reaction mixture. Separately, 12.19 g $Zn(OAc)_2 \cdot 2 H_2O$ was dissolved in 100.00 g deionized water. This solution was added fast dropwise, intermittently, allowing time to stir between additions so that any cloudiness that developed could clear. A clear solution results, which was stirred further to evaporate some of the sec-butanol that forms on hydrolysis of the aluminum sec-butoxide. The amount of solution isolated was 759.15 g, which was stored in a sealed Teflon bottle. The solution contained 0.48% Zn, 0.99% Al and 2.72% P.

A 150.00 g portion of the above solution was placed in a Teflon beaker under a high-speed mechanical stirrer. Separately, 4.79 g SDA 1 from example 1 was dissolved in 25.00 g deionized water. This solution was added fast dropwise. The reaction mixture was stirred for 2 hr and then distributed among 7 Teflon-lined Parr reactors and digested quiescently at autogenous pressure at various temperatures and time periods. The solid products were isolated and washed with de-ionized water via centrifugation and dried at room temperature. The products isolated from the 125° C./168 hr reaction (Example 2A) and the 175° C./168 hr reaction (Example 2B) were shown by powder x-ray diffraction to be ZnAPO-75 with the SAO topology. Representative x-ray diffraction lines or each product are shown in Table 1 below. Elemental analysis showed the sample isolated in Example 2B to have the stoichiometry $N_{0.29}Zn_{0.27}Al_{0.80}P$, in which Zn has occupied 25.2% of the framework M sites and 13.0% of the T-atom sites.

TABLE 1

| Example 2A | | | Example 2B | | |
|---|---|---|---|---|---|
| 2-Θ | d(Å) | $I/I_0$% | 2-Θ | d(Å) | $I/I_0$% |
| 7.55 | 11.70 | vs | 7.53 | 11.73 | vs |
| 8.09 | 10.92 | m | 8.068 | 10.95 | m |
| 8.99 | 9.83 | w | 8.947 | 9.88 | w |
| 12.10 | 7.31 | w | 12.12 | 7.30 | w |
| 12.74 | 6.94 | w | 12.774 | 6.92 | w |
| 13.74 | 6.44 | w | 13.699 | 6.46 | w |
| 14.86 | 5.96 | w | 14.837 | 5.97 | w |
| 15.13 | 5.85 | w | 15.114 | 5.86 | w |
| 16.21 | 5.46 | w | 16.192 | 5.47 | w |
| 18.61 | 4.77 | w | 18.567 | 4.78 | w |
| 19.62 | 4.52 | m | 18.765 | 4.73 | w |
| 20.68 | 4.29 | m | 19.64 | 4.52 | m |
| 21.28 | 4.17 | m | 20.697 | 4.29 | m |
| 22.78 | 3.90 | w | 21.298 | 4.17 | w |
| 23.44 | 3.79 | w | 22.779 | 3.90 | w |
| 24.45 | 3.64 | w | 23.507 | 3.78 | w |
| 24.95 | 3.57 | w | 24.411 | 3.64 | w |

TABLE 1-continued

| Example 2A | | | Example 2B | | |
|---|---|---|---|---|---|
| 2-Θ | d(Å) | I/I₀% | 2-Θ | d(Å) | I/I₀% |
| 25.73 | 3.46 | m | 24.911 | 3.57 | w |
| 26.09 | 3.41 | m | 25.707 | 3.46 | m |
| 26.83 | 3.32 | w | 26.068 | 3.42 | w |
| 27.65 | 3.22 | w | 26.826 | 3.32 | w |
| 29.26 | 3.05 | m | 27.647 | 3.22 | w |
| 29.94 | 2.98 | w | 29.261 | 3.05 | w |
| 30.58 | 2.92 | m | 29.941 | 2.98 | w |
| 31.00 | 2.88 | w | 30.539 | 2.92 | w |
| 33.67 | 2.66 | w | 30.956 | 2.89 | w |
| 33.93 | 2.64 | w | 33.631 | 2.66 | w |
| 34.65 | 2.59 | w | 33.972 | 2.64 | w |
| | | | 34.611 | 2.59 | w |

Example 4

A zincoaluminophosphate stock solution was prepared by dissolving 31.21 g aluminum isopropoxide (98%) in 274.16 g TPAOH (40%) with vigorous stirring provided by an overhead mechanical mixer. This was followed by the fast dropper wise addition of 41.10 g H$_3$PO$_4$ (85.7%). The reaction mixture was diluted with 37.33 g deionized water. Separately, 6.76 g Zn(OAc)$_2$*2H$_2$O was dissolved in 35.33 g deionized water. This solution was added intermittently, initially inducing cloudiness that clarified with stirring. The reaction mixture was stirred for several hours before it was stored in a Teflon bottle. The stock solution contained 0.51% Zn, 1.02% Al and 2.83% P.

A 150.00 g portion of this zincoaluminophosphate stock solution was placed in a Teflon beaker and an overhead high speed mixer was employed for stirring. Separately, a 5.12 g portion of SDA 1 from example 1 was dissolved in 30.00 g deionized water. This solution was added dropwise to the reaction mixture and homogenized for one hour. The reaction mixture was distributed among two 125 ml Parr reactors with Teflon liners and digested quiescently at 175° C. a autogenous pressure for 111 hr. The products were isolated by centrifugation, washed with deionized water and dried at room temperature. Characterization by powder x-ray diffraction showed the products to be ZnAPO-75 with the SAO topology. Representative X-ray diffraction lines for the product are shown in Table 2 below. Elemental analysis showed the product to have the stoichiometry N$_{0.30}$Zn$_{0.29}$Al$_{0.73}$P, in which Zn occupies 28.4% of the framework M sites and 14.4% of the framework T-atom sites.

TABLE 2

| 2-Θ | d(Å) | I/I₀ % |
|---|---|---|
| 7.63 | 11.58 | vs |
| 8.15 | 10.84 | w |
| 9.12 | 9.69 | w |
| 12.22 | 7.24 | w |
| 12.84 | 6.89 | w |
| 13.81 | 6.41 | w |
| 14.93 | 5.93 | w |
| 15.21 | 5.82 | w |
| 16.30 | 5.44 | w |
| 18.68 | 4.75 | w |
| 19.72 | 4.50 | m |
| 20.78 | 4.27 | m |
| 21.38 | 4.15 | m |
| 21.90 | 4.06 | w |
| 22.84 | 3.89 | w |
| 23.57 | 3.77 | w |
| 24.49 | 3.63 | w |
| 24.99 | 3.56 | w |
| 25.77 | 3.45 | m |
| 26.15 | 3.41 | w |
| 26.89 | 3.31 | w |
| 27.73 | 3.21 | w |
| 29.36 | 3.04 | w |
| 30.02 | 2.97 | w |
| 30.62 | 2.92 | w |
| 31.04 | 2.88 | w |
| 32.64 | 2.74 | w |
| 33.69 | 2.66 | w |
| 34.07 | 2.63 | w |
| 34.71 | 2.58 | w |
| 35.20 | 2.55 | w |

Example 5

A Teflon bottle was charged with 149.40 g TPAOH (40.16%) and 3.48 g TEOS (98%), sealed and stirred overnight. The next day, the bottle was placed in a 95° C. oven for 4 hr. The hot solution was transferred to a Teflon beaker equipped with a high-speed overhead stirrer and 16.75 g aluminum isopropoxide (13.2% Al) was added in a single pour and stirred until dissolved. This was followed by rapid dropwise addition of 22.41 g H$_3$PO$_4$ (86.0%) and the reaction mixture was allowed to stir and cool. Separately, 1.80 g Zn(OAc)$_2$*2H$_2$O was dissolved in 8.00 g deionized water. This solution was added dropwise intermittently, allowing time to stir so the reaction mixture could clear up. Separately, 3.58 g SDA 1 was dissolved in 32.00 g deionized water. This solution was added dropwise slowly, resulting in homogenous gel/suspension. The reaction mixture was distributed among six Teflon-lined Parr reactors and digested quiescently at 125, 150 and 175° C. for periods of 63 and 183 hr at autogenous pressures. The products were isolated by centrifugation, washed with deionized water and dried at room temperature. Characterization by powder X-ray diffraction showed products from the 150° C./183 hr and 175° C./63 hr digestions were pure ZnAPSO-75 with the SAO topology. Representative x-ray diffraction lines for the 175° C./63 hr product are shown in Table 3 below. Elemental analysis by X-ray Fluorescence yielded the stoichiometry Zn$_{0.27}$Al$_{0.89}$PSi$_{0.16}$, in which Zn and Si occupy 18.5% of the T-atom sites.

TABLE 3

| 2-Θ | d(Å) | I/I₀ % |
|---|---|---|
| 7.54 | 11.71 | vs |
| 8.08 | 10.94 | w |
| 9.04 | 9.78 | w |
| 12.09 | 7.32 | w |
| 12.78 | 6.92 | w |
| 13.72 | 6.45 | w |
| 14.86 | 5.96 | m |
| 15.12 | 5.85 | m |
| 16.18 | 5.47 | w |
| 18.56 | 4.78 | m |
| 18.78 | 4.72 | m |
| 19.64 | 4.52 | vs |
| 20.30 | 4.37 | m |
| 20.70 | 4.29 | s |
| 21.28 | 4.17 | m |
| 22.78 | 3.90 | w |
| 23.52 | 3.78 | w |

TABLE 3-continued

| 2-Θ | d(Å) | I/I₀ % |
|---|---|---|
| 24.42 | 3.64 | w |
| 24.88 | 3.58 | w |
| 25.72 | 3.46 | m |
| 26.04 | 3.42 | w |
| 26.86 | 3.32 | w |
| 27.62 | 3.23 | w |
| 29.26 | 3.05 | m |
| 30.02 | 2.97 | w |
| 30.54 | 2.92 | m |
| 30.94 | 2.89 | w |
| 32.08 | 2.79 | w |
| 32.58 | 2.75 | w |
| 33.64 | 2.66 | w |
| 34.02 | 2.63 | w |
| 34.64 | 2.59 | m |
| 35.14 | 2.55 | w |
| 35.76 | 2.51 | w |
| 36.72 | 2.45 | w |
| 37.64 | 2.39 | w |
| 38.48 | 2.34 | w |

Example 6

A Teflon bottle was charged with 200.00 g TPAOH (40.16%) and 9.33 g TEOS (98%) and stirred for 90 minutes. The bottle was transferred to a 95° C. oven for 2 hr to hydrolyze the TEOS. The contents of the bottle were transferred directly from the oven to a Teflon beaker equipped with a high-speed stirrer. Aluminum isopropoxide (13.2% Al), 22.42 g, was added immediately to the hot solution in a single pour and stirred until dissolved. This was followed by the fast dropwise addition of 30.00 g $H_3PO_4$ (86.0%), after which the reaction mixture was allowed to stir and cool. Separately, 1.20 g $Zn(OAc)_2 \cdot 2H_2O$ was dissolved in 7.00 g deionized water. This solution was added slow dropwise to the reaction mixture, resulting in a clear solution. Separately, 4.78 g SDA 1 from example 1 was dissolved in 40.00 g deionized water. This solution was added fast dropwise with vigorous stirring, yielding an opaque gel. The reaction mixture was transferred to 8 Teflon-lined Parr reactors, the portions digested quiescently at a variety of temperatures and time periods. The products were isolated by centrifugation, washed with deionized water and dried at room temperature. Powder X-ray diffraction showed that products resulting from the 165° C./193 hr and 175° C./133 hr digestions yielded pure ZnAPSO-75 with the SAO topology. Representative x-ray diffraction lines are shown below in Table 4 for the 175° C. product. Elemental analysis by LECO CHN and ICP on this same sample yielded the stoichiometry $N_{0.39}Zn_{0.21}Al_{0.97}PSi_{0.57}$, in which 28.3% of the T-atom sites are occupied by Zn and Si.

TABLE 4

| 2-Θ | d(Å) | I/I₀ % |
|---|---|---|
| 7.55 | 11.69 | vs |
| 8.06 | 10.96 | w |
| 9.04 | 9.78 | w |
| 12.13 | 7.29 | w |
| 12.78 | 6.92 | w |
| 13.70 | 6.46 | w |
| 14.88 | 5.95 | m |
| 15.14 | 5.85 | m |
| 16.16 | 5.48 | w |
| 18.54 | 4.78 | w |
| 18.78 | 4.72 | w |
| 19.66 | 4.51 | s |
| 20.28 | 4.37 | w |
| 20.68 | 4.29 | m |
| 21.26 | 4.18 | m |
| 22.82 | 3.89 | w |
| 23.54 | 3.78 | w |
| 24.38 | 3.65 | w |
| 24.88 | 3.58 | w |
| 25.76 | 3.46 | m |
| 26.08 | 3.41 | w |
| 26.90 | 3.31 | w |
| 27.60 | 3.23 | w |
| 29.28 | 3.05 | m |
| 30.02 | 2.97 | w |
| 30.56 | 2.92 | m |
| 30.96 | 2.89 | w |
| 32.00 | 2.79 | w |
| 32.64 | 2.74 | w |
| 33.28 | 2.69 | w |
| 33.64 | 2.66 | w |
| 34.06 | 2.63 | w |
| 34.66 | 2.59 | w |
| 35.22 | 2.55 | w |
| 36.75 | 2.44 | w |
| 37.69 | 2.39 | w |
| 38.51 | 2.34 | w |

Example 7

A Teflon beaker equipped with a high-speed overhead stirrer was charged with 135.00 g TPAOH (40.16%). To the stirring solution, 15.14 g aluminum isopropoxide (13.2% Al) was added and stirred until dissolved. Then $H_3PO_4$ (86.0%), 20.25 g was added fast dropwise, yielding a clear solution. Separately, 3.80 g $Mg(NO_3)_2 \cdot 6H_2O$ was dissolved in 10.00 g deionized water. This solution was added slow dropwise in several aliquots, allowing to stir between additions. A clear solution results. Separately, 4.85 g SDA 1 from example 1 is dissolved in 50.00 g deionized water. An opaque thin gel forms. The reaction mixture was further homogenized before it was distributed among six Teflon-lined Parr reactors. The reaction mixtures were digested for a variety of reaction periods at various temperatures. Products were isolated by centrifugation, washed with deionized water and dried at room temperature. Powder X-ray diffraction showed the product isolated from the 175° C./48 hr reaction to be pure MgAPO-75 with the SAO topology. Representative X-ray diffraction lines for the product are shown in Table 5 below.

TABLE 5

| 2-Θ | d(Å) | I/I₀ % |
|---|---|---|
| 7.52 | 11.75 | vs |
| 8.02 | 11.01 | w |
| 8.93 | 9.89 | w |
| 12.09 | 7.31 | w |
| 12.74 | 6.95 | w |
| 13.68 | 6.47 | w |
| 14.80 | 5.98 | w |
| 15.08 | 5.87 | m |
| 16.14 | 5.49 | w |
| 18.52 | 4.79 | w |
| 18.74 | 4.73 | w |
| 19.58 | 4.53 | s |
| 19.80 | 4.48 | w |
| 20.62 | 4.30 | m |
| 21.22 | 4.18 | w |
| 21.60 | 4.11 | w |
| 21.78 | 4.08 | w |

TABLE 5-continued

| 2-Θ | d(Å) | I/I₀ % |
|---|---|---|
| 22.720 | 3.91 | w |
| 23.44 | 3.79 | w |
| 24.32 | 3.66 | w |
| 24.82 | 3.58 | w |
| 25.64 | 3.47 | m |
| 26.00 | 3.42 | w |
| 26.78 | 3.33 | w |
| 26.92 | 3.31 | w |
| 27.55 | 3.24 | w |
| 29.20 | 3.06 | m |
| 29.88 | 2.99 | w |
| 30.48 | 2.93 | m |
| 30.88 | 2.89 | w |
| 33.18 | 2.70 | w |
| 33.54 | 2.67 | w |
| 33.92 | 2.64 | w |
| 34.54 | 2.59 | w |
| 35.64 | 2.52 | w |
| 37.58 | 2.39 | w |
| 38.36 | 2.34 | w |
| 38.97 | 2.31 | w |

Example 8

A Teflon beaker equipped with a high-speed overhead stirrer was charged with 160.00 g TPAOH (40%). With vigorous stirring, 17.87 g aluminum isopropoxide (13.2% Al) was added and dissolved. This was followed by the fast dropwise addition of 23.91 g $H_3PO_4$ (86.0%), resulting in a clear solution. Separately, 3.84 g $Zn(OAc)_2 \cdot 2H_2O$ was dissolved in 13.00 g deionized water. This solution was added to the reaction mixture, inducing some clouding that cleared up with stirring. Separately, 7.17 g of SDA 2 from Example 2 was suspended in 90.00 g deionized water. The suspension was added to the reaction mixture and homogenized thoroughly, leading to a reaction mixture that had the consistency of a light brown thin suspension. The suspension was divided among nine Teflon-lined Parr reactors and digested quiescently at a variety of temperature and temporal reaction conditions. The products were isolated via centrifugation, washed with deionized water and dried at room temperature. Characterization by powder X-ray diffraction showed the products of the 175° C./168 hr digestion to be pure ZnAPO-75 with the SAO topology. Representative X-ray diffraction lines for this product are given in Table 6 below. Elemental analysis yielded the stoichiometry $N_{0.27}Zn_{0.29}Al_{0.72}P$, in which Zn occupies 28.7% of the M framework sites and 14.4% of the T-atom sites.

TABLE 6

| 2-Θ | d(Å) | I/I₀ % |
|---|---|---|
| 7.54 | 11.72 | vs |
| 8.06 | 10.97 | w |
| 9.00 | 9.82 | w |
| 12.12 | 7.30 | w |
| 12.79 | 6.91 | w |
| 13.68 | 6.47 | m |
| 14.8 | 5.96 | w |
| 15.12 | 5.85 | m |
| 16.16 | 5.48 | w |
| 18.54 | 4.78 | m |
| 18.78 | 4.72 | w |
| 19.64 | 4.52 | vs |
| 20.28 | 4.38 | w |
| 20.66 | 4.30 | m |
| 21.2 | 4.18 | m |
| 22.78 | 3.90 | w |

TABLE 6-continued

| 2-Θ | d(Å) | I/I₀ % |
|---|---|---|
| 23.52 | 3.78 | w |
| 24.38 | 3.65 | w |
| 24.88 | 3.58 | m |
| 25.74 | 3.46 | m |
| 26.04 | 3.42 | w |
| 26.88 | 3.31 | w |
| 27.60 | 3.23 | w |
| 28.07 | 3.18 | w |
| 28.57 | 3.12 | w |
| 29.28 | 3.05 | m |
| 30.00 | 2.98 | w |
| 30.56 | 2.92 | m |
| 30.96 | 2.89 | w |
| 32.02 | 2.79 | w |
| 32.59 | 2.75 | w |
| 33.26 | 2.69 | w |
| 33.62 | 2.66 | m |
| 34.02 | 2.63 | w |
| 34.64 | 2.59 | m |
| 35.16 | 2.55 | w |
| 35.72 | 2.51 | w |
| 36.72 | 2.45 | w |
| 37.12 | 2.42 | w |
| 37.62 | 2.39 | w |
| 38.46 | 2.34 | w |
| 38.80 | 2.32 | w |

Example 9

A Teflon bottle was charged with 200.00 g TPAOH (40%) along with 4.65 g TEOS (98%), sealed and the mixture stirred at room temperature for 3 hr. The bottle was transferred to a 95° C. oven for 4 hr and the hot solution was transferred to a Teflon beaker equipped with a high-speed stirrer. Immediately, 22.34 g aluminum isopropoxide (13.2% Al) was added in a single pour to the hot solution with vigorous stirring. After this dissolved, 29.88 g $H_3PO_4$ (86.0%) was added fast dropwise, yielding a clear solution. The reaction mixture was allowed to stir and cool. Separately, 1.20 g $Zn(OAc)_2 \cdot 2H_2O$ was dissolved in 5.53 g deionized water. This solution was added slow dropwise, some clouding developed in solution which cleared up after further stirring. Separately, 4.77 g SDA 1 from Example 1 was dissolved in 37.00 g deionized water. This solution was added dropwise to the reaction mixture, converting the clear solution to a milky gel. The reaction mixture was homogenized for 2 hr before it was distributed among 8 Teflon-lined Parr reactors and digested either quiescently or with rotation at a variety of temperatures and temporal periods. The products were isolated by centrifugation, washed with deionized water and dried at room temperature. Characterization via powder X-ray diffraction revealed the products of the 175° C./85 hr digestions from both the static and rotary preparations to be pure ZnAPSO-75 with the SAO topology. Representative X-ray diffraction lines for the product are given in Table 7 for the rotary preparation, Example 9A, and the static preparation, Example 9 B. Elemental analysis on the product from the Example 9A rotary preparation by X-ray Fluorescence yielded the stoichiometry $Zn_{0.22}Al_{0.85}PSi_{0.08}$, in which Zn and Si occupy 14.0% of the T-atom sites. Analysis by SEM showed the crystals of the Example 9B sample to be 100 nm to 5μ diameter faceted polyhedra.

TABLE 7

| Example 9A | | | Example 9B | | |
|---|---|---|---|---|---|
| 2-Θ | d(Å) | I/I₀ % | 2-Θ | d(Å) | I/I₀ % |
| 7.54 | 11.71 | vs | 7.51 | 11.68 | vs |
| 8.04 | 10.99 | w | 8.06 | 10.96 | w |
| 9.023 | 9.79 | w | 9.04 | 9.77 | w |
| 12.10 | 7.31 | w | 12.12 | 7.30 | w |
| 12.78 | 6.92 | w | 12.80 | 6.91 | w |
| 13.66 | 6.48 | w | 13.70 | 6.46 | w |
| 14.88 | 5.95 | w | 14.88 | 5.95 | m |
| 15.12 | 5.85 | m | 15.16 | 5.84 | m |
| 16.12 | 5.49 | w | 16.16 | 5.48 | w |
| 17.52 | 5.06 | w | 17.543 | 5.05 | w |
| 18.52 | 4.79 | w | 18.56 | 4.78 | w |
| 18.77 | 4.73 | w | 18.78 | 4.72 | w |
| 19.66 | 4.51 | s | 19.68 | 4.51 | vs |
| 19.84 | 4.47 | w | 20.30 | 4.37 | w |
| 20.28 | 4.37 | w | 20.66 | 4.30 | m |
| 20.64 | 4.30 | m | 21.24 | 4.18 | m |
| 21.22 | 4.18 | m | 22.80 | 3.90 | w |
| 21.64 | 4.10 | w | 23.52 | 3.78 | w |
| 21.83 | 4.07 | w | 24.38 | 3.65 | w |
| 22.79 | 3.90 | w | 24.90 | 3.57 | w |
| 23.49 | 3.78 | w | 25.76 | 3.46 | m |
| 24.36 | 3.65 | w | 26.04 | 3.42 | w |
| 24.84 | 3.58 | m | 26.90 | 3.31 | w |
| 25.74 | 3.46 | m | 27.60 | 3.23 | w |
| 26.04 | 3.42 | w | 29.28 | 3.05 | m |
| 26.86 | 3.32 | w | 30.02 | 2.97 | w |
| 27.02 | 3.30 | w | 30.58 | 2.92 | m |
| 27.56 | 3.23 | w | 30.98 | 2.88 | w |
| 29.26 | 3.05 | m | 32.03 | 2.79 | w |
| 30.00 | 2.98 | w | 32.62 | 2.74 | w |
| 30.56 | 2.92 | m | 33.28 | 2.69 | w |
| 30.94 | 2.89 | w | 33.62 | 2.66 | w |
| 32.63 | 2.74 | w | 34.02 | 2.63 | w |
| 33.26 | 2.69 | w | 34.64 | 2.59 | w |
| 33.60 | 2.66 | w | 35.20 | 2.55 | w |
| 33.96 | 2.64 | w | 35.76 | 2.51 | w |
| 34.64 | 2.59 | w | 36.76 | 2.44 | w |
| 35.18 | 2.55 | w | 37.10 | 2.42 | w |
| 35.67 | 2.52 | w | 37.62 | 2.39 | w |
| 36.74 | 2.44 | w | 38.50 | 2.34 | w |
| 37.60 | 2.39 | w | 38.80 | 2.32 | w |
| 38.47 | 2.34 | w | 39.10 | 2.30 | w |

Example 10

A large beaker was charged with 588.17 g of TPAOH (40%). Ground aluminum isopropoxide (13.2% Al), 66.97 g, was then added with vigorous stirring provided by an overhead stirrer, and quickly dissolved. This was followed by the slow addition of $H_3PO_4$ (85%), 89.00 g, while continuing to mix. Separately, 14.40 g $Zn(OAc)_2 \cdot 2H_2O$ was dissolved in 130.00 g deionized water. This solution was then slowly added to the reaction mixture with stirring, yielding a clear solution. Separately, 28.04 g of SDA 1 was dissolved in 183.42 g deionized water. That solution was then slowly added to the reaction mixture while continuing to mix. The resultant liquid was mixed for 30 minutes forming a homogenous white suspension. The reaction mixture was transferred to a 2 L Parr autoclave and digested quiescently at autogenous pressure for 7 days at 175° C. The solid was collected and washed with deionized water by centrifugation. The washed solid was then dried overnight at 100° C. Characterization of the solid by powder x-ray diffraction identified the product as pure ZnAPO-75 with the SAO topology. Representative x-ray diffraction lines observed for the ZnAPO-75 product are given in Table 8 below. Elemental analysis performed on this sample yielded the stoichiometry $N_{0.29}Zn_{0.28}Al_{0.76}P$, in which Zn occupies 26.9% of the M sites and 13.7% of the T-atom sites.

TABLE 8

| 2-Θ | d(Å) | I/I₀ % |
|---|---|---|
| 7.52 | 11.75 | vs |
| 8.07 | 10.94 | m |
| 8.98 | 9.84 | w |
| 12.11 | 7.30 | w |
| 12.75 | 6.94 | w |
| 13.69 | 6.46 | w |
| 14.84 | 5.96 | w |
| 15.12 | 5.85 | w |
| 16.18 | 5.47 | w |
| 18.55 | 4.78 | w |
| 18.75 | 4.73 | w |
| 19.61 | 4.52 | m |
| 20.66 | 4.30 | m |
| 21.28 | 4.17 | m |
| 22.73 | 3.91 | w |
| 23.43 | 3.79 | w |
| 24.35 | 3.65 | w |
| 24.88 | 3.58 | w |
| 25.68 | 3.47 | m |
| 26.02 | 3.42 | w |
| 26.80 | 3.32 | w |
| 27.63 | 3.23 | w |
| 29.24 | 3.05 | w |
| 29.96 | 2.98 | w |
| 30.50 | 2.93 | m |
| 30.96 | 2.89 | w |
| 33.59 | 2.67 | w |
| 33.98 | 2.64 | w |
| 34.58 | 2.59 | w |
| 35.72 | 2.51 | w |
| 36.61 | 2.45 | w |
| 37.63 | 2.39 | w |
| 38.82 | 2.32 | w |

Embodiments

A first embodiment is a microporous crystalline metallophosphate-based material having a three-dimensional framework of at least $EO_{4/2}^-$, $[MO_{4/2}]^{2-}$ and $PO_{4/2}^+$ tetrahedral units and an empirical composition in the as synthesized and anhydrous basis expressed by an empirical formula of:

$$R^{p+}{}_rM_w{}^{2+}E_xPSi_yO_z$$

where M is at least one framework divalent metal cation selected from $Mg^{2+}$, $Zn^{2+}$, $Mn^{2+}$ and combinations thereof, "w" is the mole ratio of M to P and varies from 0.1 to about 0.35, R is a quaternary ammonium cation selected from tetraethylammonium (TEA⁺), methyltriethylammonium (MTEA⁺), dimethyldipropylammonium (DMDPA⁺), tetrapropylammonium (TPA⁺), tetrabutylammonium (TBA⁺), N,N,N',N'-tetramethyl-N,N'-p-xyleno-1,6-hexanediammonium (pXC₆²⁺), N,N,N',N'-tetramethyl-N,N'-m-xyleno-1,6-hexanediammonium (mXC₆²⁺), the quaternary ammonium cation resulting from the alkylation of N,N,N',N'-tetramethyl-1,6-hexanediamine with 1,3,5-tris(bromomethyl)benzene (TC₆³⁺), the quaternary ammonium cation resulting from the alkylation of N,N,N',N'-tetramethyl-1,6-hexanediamine with 2,4,6-tris(bromomethyl)phenol (TOHC₆³⁺) and combinations thereof, "r" is the mole ratio of R to P and has a value of about 0.1 to about 0.75, "p" is the average weighted valence of R and varies from 1 to 3, E is an trivalent element selected from aluminum, gallium and combinations thereof, "x" is mole ratio of E to P and varies from 0.65 to 1.2, "y" is the mole ratio of Si to P and varies from 0 to 1.0, the amount of combined M² and Si insertion into the framework is given by $(w+y)/(w+x+1+y) \geq 0.115$, and "z" is the mole ratio of O to P and has a value determined by the equation:

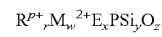

$$z=(p \cdot r+2 \cdot w+3 \cdot x+5+4 \cdot y)/2$$

and is characterized in that it has the x-ray diffraction pattern having at least the d-spacings and intensities set forth in Table A:

TABLE A

| 2Θ | d(Å) | I/I₀ % |
|---|---|---|
| 7.685-7.465 | 11.494-11.833 | vs |
| 8.215-7.963 | 10.755-11.095 | w-m |
| 9.221-8.838 | 9.583-9.998 | w |
| 12.285-12.022 | 7.199-7.356 | w |
| 12.893-12.683 | 6.861-6.974 | w |
| 13.889-13.588 | 6.371-6.511 | w-m |
| 15.001-14.739 | 5.901-6.005 | w-m |
| 15.277-15.017 | 5.795-5.895 | w-m |
| 16.376-16.039 | 5.409-5.522 | w |
| 18.763-18.438 | 4.726-4.808 | w-m |
| 19.791-19.511 | 4.482-4.546 | m-vs |
| 20.858-20.542 | 4.255-4.320 | m-s |
| 21.463-21.138 | 4.137-4.200 | w-m |
| 22.895-22.661 | 3.881-3.921 | w |
| 23.639-23.365 | 3.761-3.804 | w |
| 24.580-24.239 | 3.619-3.669 | w |
| 25.077-24.739 | 3.548-3.596 | w-m |
| 25.859-25.569 | 3.443-3.481 | m |
| 26.221-25.923 | 3.396-3.434 | w-m |
| 26.962-26.717 | 3.304-3.334 | w |
| 27.819-27.455 | 3.204-3.246 | w |
| 29.439-29.117 | 3.032-3.064 | w-m |
| 30.090-29.814 | 2.968-2.994 | w |
| 30.689-30.407 | 2.911-2.937 | w-m |
| 31.117-30.804 | 2.872-2.900 | w |
| 33.767-33.465 | 2.652-2.676 | w-m |
| 34.147-33.846 | 2.624-2.646 | w |
| 34.792-34.453 | 2.576-2.601 | w-m |

The metallophosphate-based material of the first embodiment where E is aluminum or gallium.

The metallophosphate-based material of the first embodiment where M is selected from magnesium, zinc, cobalt, manganese, and combinations thereof.

The metallophosphate-based material of the first embodiment where "y" is zero and $(w+y)/(w+x+1+y) \geq 0.13$.

The metallophosphate-based material of the first embodiment where "y" is greater than zero and $(w+y)/(w+x+1+y) \geq 0.25$.

The metallophosphate-based material of the first embodiment where R is selected from N,N,N',N'-tetramethyl-N,N'-p-xyleno-1,6-hexanediammonium ($pXC_6^{2+}$), N,N,N',N'-tetramethyl-N,N'-m-xyleno-1,6-hexanediammonium ($mXC_6^{2+}$), the quaternary ammonium cation resulting from the alkylation of N,N,N',N'-tetramethyl-1,6-hexanediamine with 1,3,5-tris(bromomethyl)benzene ($TC_6^{3+}$) and combinations thereof.

The metallophosphate-based material of the first embodiment where R is at least two quaternary ammonium ions R1 and R2 where R1 is selected from N,N,N',N'-tetramethyl-N,N'-p-xyleno-1,6-hexanediammonium ($pXC_6^{2+}$), N,N,N',N'-tetramethyl-N,N'-m-xyleno-1,6-hexanediammonium ($mXC_6^{2+}$), the quaternary ammonium cation resulting from the alkylation of N,N,N',N'-tetramethyl-1,6-hexanediamine with 1,3,5-tris(bromomethyl)benzene ($TC_6^{3+}$) and combinations thereof and R2 is selected from $TPA^+$, $TBA^+$, $TEA^+$, $MTEA^+$, $DPDMA^+$ cations and combinations thereof.

A modified form of the crystalline microporous metallophosphate of the first embodiment, comprising a three-dimensional framework of at least $[M^{2+}O_{4/2}]^{2-}$, $EO_{4/2}^-$ and $PO_{4/2}^+$ tetrahedral units and optionally $SiO_{4/2}$ tetrahedral units, the modifications including calcination, ammonia calcinations, ozone calcination, ion-exchange, steaming, acid extraction, ammonium hexafluorosilicate treatment, or any combination thereof.

A second embodiment is a process for preparing a microporous crystalline metallophosphate-based material having a three-dimensional framework of at least $[M^{2+}O_{4/2}]^{2-}$, $EO_{4/2}^-$ and $PO_{4/2}^+$ tetrahedral units and optionally $SiO_{4/2}$ tetrahedral units and an empirical composition in the as synthesized and anhydrous basis expressed by an empirical formula of:

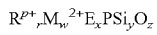

$$R^{p+}_r M^{2+}_w E_x PSi_y O_z$$

where M is at least one framework divalent metal cation selected from $Mg^{2+}$, $Zn^{2+}$, $Co^{2+}$, $Mn^{2+}$ and combinations thereof, "w" is the mole ratio of M to P and varies from 0.1 to about 0.35, R is a quaternary ammonium cation selected from tetraethylammonium ($TEA^+$), methyltriethylammonium ($MTEA^+$), dimethyldipropylammonium ($DMDPA^+$), tetrapropylammonium ($TPA^+$), tetrabutylammonium ($TBA^+$), N,N,N',N'-tetramethyl-N,N'-p-xyleno-1,6-hexanediammonium ($pXC_6^{2+}$), N,N,N',N'-tetramethyl-N,N'-m-xyleno-1,6-hexanediammonium ($mXC_6^{2+}$), the quaternary ammonium cation resulting from the alkylation of N,N,N',N'-tetramethyl-1,6-hexanediamine with 1,3,5-tris(bromomethyl)benzene ($TC_6^{3+}$), the quaternary ammonium cation resulting from the alkylation of N,N,N',N'-tetramethyl-1,6-hexanediamine with 2,4,6-tris(bromomethyl)phenol ($TOHC_6^{3+}$) and combinations thereof, "r" is the mole ratio of R to P and has a value of about 0.1 to about 0.75, "p" is the average weighted valence of R and varies from 1 to 3, E is an trivalent element selected from consisting of aluminum, gallium and combinations thereof, "x" is mole ratio of E to P and varies from 0.65 to 1.2, "y" is the mole ratio of Si to P and varies from 0 to 1.0, the amount of combined $M^{2+}$ and Si insertion into the framework is given by $(w+y)/(w+x+1+y) \geq 0.115$, and "z" is the mole ratio of O to P and has a value determined by the equation:

$$z=(p \cdot r+2 \cdot w+3 \cdot x+5+4 \cdot y)/2$$

and is characterized in that it has the x-ray diffraction pattern having at least the d-spacings and intensities set forth in Table A:

TABLE A

| 2Θ | d(Å) | I/I₀ % |
|---|---|---|
| 7.685-7.465 | 11.494-11.833 | vs |
| 8.215-7.963 | 10.755-11.095 | w-m |
| 9.221-8.838 | 9.583-9.998 | w |
| 12.285-12.022 | 7.199-7.356 | w |
| 12.893-12.683 | 6.861-6.974 | w |
| 13.889-13.588 | 6.371-6.511 | w-m |
| 15.001-14.739 | 5.901-6.005 | w-m |
| 15.277-15.017 | 5.795-5.895 | w-m |
| 16.376-16.039 | 5.409-5.522 | w |
| 18.763-18.438 | 4.726-4.808 | w-m |
| 19.791-19.511 | 4.482-4.546 | m-vs |
| 20.858-20.542 | 4.255-4.320 | m-s |
| 21.463-21.138 | 4.137-4.200 | w-m |
| 22.895-22.661 | 3.881-3.921 | w |
| 23.639-23.365 | 3.761-3.804 | w |
| 24.580-24.239 | 3.619-3.669 | w |
| 25.077-24.739 | 3.548-3.596 | w-m |
| 25.859-25.569 | 3.443-3.481 | m |
| 26.221-25.923 | 3.396-3.434 | w-m |
| 26.962-26.717 | 3.304-3.334 | w |
| 27.819-27.455 | 3.204-3.246 | w |
| 29.439-29.117 | 3.032-3.064 | w-m |
| 30.090-29.814 | 2.968-2.994 | w |
| 30.689-30.407 | 2.911-2.937 | w-m |
| 31.117-30.804 | 2.872-2.900 | w |

TABLE A-continued

| 2Θ | d(Å) | I/I₀ % |
|---|---|---|
| 33.767-33.465 | 2.652-2.676 | w-m |
| 34.147-33.846 | 2.624-2.646 | w |
| 34.792-34.453 | 2.576-2.601 | w-m | the process comprising forming a reaction mixture containing reactive sources of R, E, P, M and optionally Si and heating the reaction mixture at a temperature of about 60° C. to about 175° C., for a time sufficient to form the metallophosphate-based material, the reaction mixture having a composition expressed in terms of mole ratios of the oxides of:

$$aR_{2/p}O:bMO:E_2O_3:cP_2O_5:dSiO_2:eH_2O$$

where "a" has a value of 0.75 to 22, "b" has a value of 0.05 to 2, "c" has a value of 1.0 to 10, "d" has a value of 0 to 4, and "e" has a value from 20 to 2000.

The process of the second embodiment where E is aluminum or gallium. The process where M is selected from magnesium, zinc, cobalt, manganese and combinations thereof.

The process of the second embodiment where the source of M is selected from halide salts, nitrate salts, acetate salts, sulfate salts and combinations thereof.

The process of the second embodiment where the source of E is selected from aluminum isopropoxide, aluminum sec-butoxide, precipitated alumina, Al(OH)₃, aluminum metal, aluminum salts, precipitated gallium oxyhydroxide, gallium sulfate, gallium nitrate, and gallium chloride.

The process of the second embodiment where the silicon source is selected from tetraethylorthosilicate, fumed silica, colloidal silica and precipitated silica.

The process of the second embodiment where the reaction mixture is reacted at a temperature of about 125° C. to about 175° C. for a time of about 1 day to about 7 days.

The process of the second embodiment where R is selected from N,N,N',N'-tetramethyl-N,N'-p-xyleno-1,6-hexanediammonium ($pXC_6^{2+}$); N,N,N',N'-tetramethyl-N,N'-m-xyleno-1,6-hexanediammonium ($mXC_6^{2+}$); the quaternary ammonium cation resulting from the alkylation of N,N,N',N'-tetramethyl-1,6-hexanediamine with 1,3,5-tris(bromomethyl)benzene ($TC_6^{3+}$), the quaternary ammonium cation resulting from the alkylation of N,N,N',N'-tetramethyl-1,6-hexanediamine with 2,4,6-tris(bromomethyl)phenol ($TOHC_6^{3+}$) and combinations thereof.

The process of the second embodiment where R is at least two quaternary ammonium ions R1 and R2 where R1 is selected from N,N,N',N'-tetramethyl-N,N'-p-xyleno-1,6-hexanediammonium ($pXC_6^{2+}$), N,N,N',N'-tetramethyl-N,N'-m-xyleno-1,6-hexanediammonium ($mXC_6^{2+}$), the quaternary ammonium cation resulting from the alkylation of N,N,N',N'-tetramethyl-1,6-hexanediamine with 1,3,5-tris(bromomethyl)benzene ($TC_6^{3+}$), the quaternary ammonium cation resulting from the alkylation of N,N,N',N'-tetramethyl-1,6-hexanediamine with 2,4,6-tris(bromomethyl)phenol ($TOHC_6^{3+}$) and combinations thereof and R2 is selected from $TPA^+$, $TBA^+$, $TEA^+$, $MTEA^+$, $DPDMA^+$ cations and combinations thereof.

The process of the second embodiment further comprising adding AlPO-75 seeds to the reaction mixture.

A third embodiment is a process comprising contacting a stream with a material to generate a product;

wherein the process is a hydrocarbon conversion process, the stream is a hydrocarbon stream, and the product is a converted product; or wherein the process is a separation process, the stream is a mixture of at least two components; and the product is at least one separated component;

wherein the material comprises a microporous crystalline AlPO-75 material, a modified microporous crystalline AlPO-75 material, or combinations thereof, wherein the AlPO-75 has a three-dimensional framework of at least $EO_{4/2}^-$, $[MO_{4/2}]^{2-}$ and $PO_{4/2}^+$ tetrahedral units and an empirical composition in the as synthesized and anhydrous basis expressed by an empirical formula of:

$$R^{p+}_rM_w^{2+}E_xPSi_yO_z$$

where M is at least one framework divalent metal cation selected from $Mg^{2+}$, $Zn^{2+}$, $Co^{2+}$, $Mn^{2+}$ and combinations thereof, "w" is the mole ratio of M to P and varies from 0.1 to about 0.35, R is a quaternary ammonium cation selected from tetraethylammonium ($TEA^+$), methyltriethylammonium ($MTEA^+$), dimethyldipropylammonium ($DMDPA^+$), tetrapropylammonium ($TPA^+$), tetrabutylammonium ($TBA^+$), N,N,N',N'-tetramethyl-N,N'-p-xyleno-1,6-hexanediammonium ($pXC_6^{2+}$), N,N,N',N'-tetramethyl-N,N'-m-xyleno-1,6-hexanediammonium ($mXC_6^{2+}$), the quaternary ammonium cation resulting from the alkylation of N,N,N',N'-tetramethyl-1,6-hexanediamine with 1,3,5-tris(bromomethyl)benzene ($TC_6^{3+}$), the quaternary ammonium cation resulting from the alkylation of N,N,N',N'-tetramethyl-1,6-hexanediamine with 2,4,6-tris(bromomethyl)phenol ($TOHC_6^{3+}$) and combinations thereof, "r" is the mole ratio of R to P and has a value of about 0.1 to about 0.75, "p" is the average weighted valence of R and varies from 1 to 3, E is an trivalent element selected from aluminum, gallium and combinations thereof, "x" is mole ratio of E to P and varies from 0.65 to 1.2, "y" is the mole ratio of Si to P and varies from 0 to 1.0, the amount of combined $M^{2+}$ and Si insertion into the framework is given by (w+y)/(w+x+1+y) ≥0.115, and "z" is the mole ratio of O to P and has a value determined by the equation:

$$z=(p \cdot r+2 \cdot w+3 \cdot x+5+4 \cdot y)/2$$

and is characterized by an x-ray diffraction pattern having at least the d-spacings and intensities set forth in Table A:

TABLE A

| 2-Θ | d(Å) | I/I₀ % |
|---|---|---|
| 7.685-7.465 | 11.494-11.833 | vs |
| 8.215-7.963 | 10.755-11.095 | w-m |
| 9.221-8.838 | 9.583-9.998 | w |
| 12.285-12.022 | 7.199-7.356 | w |
| 12.893-12.683 | 6.861-6.974 | w |
| 13.889-13.588 | 6.371-6.511 | w-m |
| 15.001-14.739 | 5.901-6.005 | w-m |
| 15.277-15.017 | 5.795-5.895 | w-m |
| 16.376-16.039 | 5.409-5.522 | w |
| 18.763-18.438 | 4.726-4.808 | w-m |
| 19.791-19.511 | 4.482-4.546 | m-vs |
| 20.858-20.542 | 4.255-4.320 | m-s |
| 21.463-21.138 | 4.137-4.200 | w-m |
| 22.895-22.661 | 3.881-3.921 | w |
| 23.639-23.365 | 3.761-3.804 | w |
| 24.580-24.239 | 3.619-3.669 | w |
| 25.077-24.739 | 3.548-3.596 | w-m |
| 25.859-25.569 | 3.443-3.481 | m |
| 26.221-25.923 | 3.396-3.434 | w-m |
| 26.962-26.717 | 3.304-3.334 | w |
| 27.819-27.455 | 3.204-3.246 | w |
| 29.439-29.117 | 3.032-3.064 | w-m |
| 30.090-29.814 | 2.968-2.994 | w |
| 30.689-30.407 | 2.911-2.937 | w-m |
| 31.117-30.804 | 2.872-2.900 | w |
| 33.767-33.465 | 2.652-2.676 | w-m |

TABLE A

| 2-Θ | d(Å) | I/I₀ % |
|---|---|---|
| 7.685-7.465 | 11.494-11.833 | vs |
| 8.215-7.963 | 10.755-11.095 | w-m |
| 9.221-8.838 | 9.583-9.998 | w |
| 12.285-12.022 | 7.199-7.356 | w |
| 12.893-12.683 | 6.861-6.974 | w |
| 13.889-13.588 | 6.371-6.511 | w-m |
| 15.001-14.739 | 5.901-6.005 | w-m |
| 15.277-15.017 | 5.795-5.895 | w-m |
| 16.376-16.039 | 5.409-5.522 | w |
| 18.763-18.438 | 4.726-4.808 | w-m |
| 19.791-19.511 | 4.482-4.546 | m-vs |
| 20.858-20.542 | 4.255-4.320 | m-s |
| 21.463-21.138 | 4.137-4.200 | w-m |
| 22.895-22.661 | 3.881-3.921 | w |
| 23.639-23.365 | 3.761-3.804 | w |
| 24.580-24.239 | 3.619-3.669 | w |
| 25.077-24.739 | 3.548-3.596 | w-m |
| 25.859-25.569 | 3.443-3.481 | m |
| 26.221-25.923 | 3.396-3.434 | w-m |
| 26.962-26.717 | 3.304-3.334 | w |
| 27.819-27.455 | 3.204-3.246 | w |
| 29.439-29.117 | 3.032-3.064 | w-m |
| 30.090-29.814 | 2.968-2.994 | w |
| 30.689-30.407 | 2.911-2.937 | w-m |
| 31.117-30.804 | 2.872-2.900 | w |
| 33.767-33.465 | 2.652-2.676 | w-m |
| 34.147-33.846 | 2.624-2.646 | w |
| 34.792-34.453 | 2.576-2.601 | w-m | wherein the modified crystalline microporous AlPO-75 comprises a three-dimensional framework of at least $[M^{2+}O_{4/2}]^{2-}$, $EO_{4/2}^{-}$ and $PO_{4/2}^{+}$ tetrahedral units and optionally $SiO_{4/2}$ tetrahedral units derived from AlPO-75 by calcination, ammonia calcination, ion-exchange, steaming, acid extraction, ammonium hexafluorosilicate treatment, or any combination thereof.

The process of the third embodiment where the hydrocarbon conversion process is selected from methanol to olefins, alkylation, isomerization, olefin dimerization and oligomerization and dewaxing.

The process of the third embodiment wherein the separation is based on molecular size of the components, degree of polarity of the components, or ion exchange of the components with the material.

What is claimed is:

1. A microporous crystalline metallophosphate-based material having a three-dimensional framework of at least $EO_{4/2}^{-}$, $[M^{2+}O_{4/2}]^{2-}$ and $PO_{4/2}^{+}$ tetrahedral units and an empirical composition in the as synthesized and anhydrous basis expressed by an empirical formula of:

$$R^{p+}{}_{r}M_{w}{}^{2+}E_{x}PSi_{y}O_{z}$$

where M is at least one framework divalent metal cation selected from $Mg^{2+}$, $Zn^{2+}$, $Co^{2+}$, $Mn^{2+}$ and combinations thereof, "w" is the mole ratio of M to P and varies from 0.1 to about 0.35, R is a quaternary ammonium cation selected from tetraethylammonium (TEA⁺), methyltriethylammonium (MTEA⁺), dimethyldipropylammonium (DMDPA⁺), tetrapropylammonium (TPA⁺), tetrabutylammonium (TBA⁺), N,N,N',N'-tetramethyl-N,N'-p-xyleno-1,6-hexanediammonium (pXC₆²⁺), N,N,N',N'-tetramethyl-N,N'-m-xyleno-1,6-hexanediammonium (mXC₆²⁺), the quaternary ammonium cation resulting from the alkylation of N,N,N',N'-tetramethyl-1,6-hexanediamine with 1,3,5-tris(bromomethyl)benzene (TC₆³⁺), the quaternary ammonium cation resulting from the alkylation of N,N,N',N'-tetramethyl-1,6-hexanediamine with 2,4,6-tris(bromomethyl)phenol (TOHC₆³⁺) and combinations thereof, "r" is the mole ratio of R to P and has a value of about 0.1 to about 0.75, "p" is the average weighted valence of R and varies from 1 to 3, E is an trivalent element selected from aluminum, gallium and combinations thereof, "x" is mole ratio of E to P and varies from 0.65 to 1.2, "y" is the mole ratio of Si to P and varies from 0 to 1.0, the amount of combined $M^{2+}$ and Si insertion into the framework is given by (w+y)/(w+x+1+y)≥0.115, and "z" is the mole ratio of O to P and has a value determined by the equation:

$$z=(p\cdot r+2\cdot w+3\cdot x+5+4\cdot y)/2$$

and is characterized in that it has the x-ray diffraction pattern having at least the d-spacings and intensities set forth in Table A:

TABLE A-continued

| 2-Θ | d(Å) | I/I₀ % |
|---|---|---|
| 34.147-33.846 | 2.624-2.646 | w |
| 34.792-34.453 | 2.576-2.601 | w-m |

2. The metallophosphate-based material of claim 1 where "y" is zero and (w+y)/(w+x+1+y)≥0.13.

3. The metallophosphate-based material of claim 1 where "y" is greater than zero and (w+y)/(w+x+1+y)≥0.25.

4. The metallophosphate-based material of claim 1 where R is selected from N,N,N',N'-tetramethyl-N,N'-p-xyleno-1,6-hexanediammonium (pXC₆²⁺), N,N,N',N'-tetramethyl-N,N'-m-xyleno-1,6-hexanediammonium (mXC₆²⁺), the quaternary ammonium cation resulting from the alkylation of N,N,N',N'-tetramethyl-1,6-hexanediamine with 1,3,5-tris(bromomethyl)benzene (TC₆³⁺), the quaternary ammonium cation resulting from the alkylation of N,N,N',N'-tetramethyl-1,6-hexanediamine with 2,4,6-tris(bromomethyl)phenol (TOHC₆³⁺), and combinations thereof.

5. The metallophosphate-based material of claim 1 where R is at least two quaternary ammonium ions R1 and R2 where R1 is selected from N,N,N',N'-tetramethyl-N,N'-p-xyleno-1,6-hexanediammonium (pXC₆²⁺), N,N,N',N'-tetramethyl-N,N'-m-xyleno-1,6-hexanediammonium (mXC₆²⁺), the quaternary ammonium cation resulting from the alkylation of N,N,N',N'-tetramethyl-1,6-hexanediamine with 1,3,5-tris(bromomethyl)benzene (TC₆³⁺), the quaternary ammonium cation resulting from the alkylation of N,N,N',N'-tetramethyl-1,6-hexanediamine with 2,4,6-tris(bromomethyl)phenol (TOHC₆³⁺) and combinations thereof and R2 is selected from TPA⁺, TBA⁺, TEA⁺, MTEA⁺, DPDMA⁺ cations and combinations thereof.

6. The metallophosphate-based material of claim 1 wherein material comprises the three-dimensional framework of at least $[M^{2+}O_{4/2}]^{2-}$, $EO_{4/2}^{-}$ and $PO_{4/2}^{+}$ tetrahedral units and optionally $SiO_{4/2}$ tetrahedral units and as modified by calcination, ammonia calcination, ozone calcination, ion-exchange, steaming, acid extraction, ammonium hexafluorosilicate treatment, or any combination thereof.

* * * * *